United States Patent [19]
Farrell et al.

[11] Patent Number: 5,179,410
[45] Date of Patent: Jan. 12, 1993

[54] PRINTER DYNAMIC JOB RECOVERY IN AN ELECTRONIC REPROGRAPHIC PRINTING SYSTEM

[75] Inventors: Michael E. Farrell, Fairport; Carla J. Kinder, Ontario; Pedro R. Ortiz, Webster; James F. Matysek, Fairport; John C. Austin, Rochester, all of N.Y.

[73] Assignee: Xerox Corporation, Stamford, Conn.

[21] Appl. No.: 793,323

[22] Filed: Nov. 15, 1991

Related U.S. Application Data

[63] Continuation of Ser. No. 589,613, Sep. 28, 1990, abandoned.

[51] Int. Cl.⁵ .......................................... G03G 21/00
[52] U.S. Cl. ............................ 355/207; 355/204; 355/309; 355/321; 358/405
[58] Field of Search ............... 355/203, 204, 205, 206, 355/207, 208, 309, 77, 321; 358/404, 405, 406

[56] References Cited

U.S. PATENT DOCUMENTS

| | | | |
|---|---|---|---|
| 4,163,897 | 8/1979 | Hubbard et al. | 355/207 X |
| 4,190,354 | 2/1980 | Smith et al. | 355/309 |
| 4,206,996 | 6/1080 | Clark et al. | 355/207 |
| 4,229,100 | 10/1980 | Travis | 355/77 |
| 4,327,993 | 5/1982 | Gauronski et al. | 355/207 |
| 4,338,023 | 7/1982 | McGibbon | 355/206 |
| 4,786,041 | 11/1988 | Acquaviva et al. | 355/206 X |

Primary Examiner—A. T. Grimley
Assistant Examiner—J. E. Barlow, Jr.
Attorney, Agent, or Firm—Oliff & Berridge

[57] ABSTRACT

A printer dynamic job recovery operation in an electronic reprographic system includes automatic detection of a printed sheet having an image thereon with a relative loss of integrity. Specified sheets are automatically purged to a specified location in response to such detection. The purging can begin at the first detected sheet or up to three sheets in advance of the detected sheet. Job recovery for job completion can be initiated immediately without cycling down the printer.

12 Claims, 13 Drawing Sheets

COMPARISON OF THE DYNAMIC RECOVERY IMPLEMENTATIONS

| ATTRIBUTE | DYNAMIC RCOVERY VARIATIONS | | |
|---|---|---|---|
| | BASIC | OPTIMIZED | ADVANCED |
| SHEETS PURGED AHEAD OF "BAD" SHEET? | YES, UP TO THREE. | NO. | NO. |
| START OF RECOVERY BASED ON....? | DELIVERY OF LAST PURGE SHEET. | DELIVERY OF LAST GOOD SHEET AHEAD OF PURGE. | NOT BASED ON SHEET DELIVERIES, STARTS IMMEDIATELY WHERE IT LEFT OFF. |
| SKIP PITCHES? | YES, WHILE WAITING FOR PURGE DELIVERIES | YES, WHILE WAITING FOR PURGE DELIVERIES. | NO. |

FIG. 7

COMPARISON OF THE DYNAMIC RECOVERY IMPLEMENTATIONS

| ATTRIBUTE | DYNAMIC RECOVERY VARIATIONS | | |
|---|---|---|---|
| | BASIC | OPTIMIZED | ADVANCED |
| SHEETS PURGED AHEAD OF "BAD" SHEET? | YES, UP TO THREE. | NO. | NO. |
| START OF RECOVERY BASED ON....? | DELIVERY OF LAST PURGE SHEET. | DELIVERY OF LAST GOOD SHEET AHEAD OF PURGE. | NOT BASED ON SHEET DELIVERIES, STARTS IMMEDIATELY WHERE IT LEFT OFF. |
| SKIP PITCHES? | YES, WHILE WAITING FOR PURGE DELIVERIES | YES, WHILE WAITING FOR PURGE DELIVERIES. | NO. |

*FIG. 9*

PRINTER DYNAMIC JOB RECOVERY IN AN ELECTRONIC REPROGRAPHIC PRINTING SYSTEM

This is a continuation of application Ser. No. 589,613, filed Sep. 28, 1990, now abandoned.

CROSS REFERENCE TO RELATED APPLICATION

This application is related to U.S. patent application No. 07/589,544, entitled "Method and Apparatus for Operating an Electronic Reprographic System Upon Detection of a Fault," filed Sep. 28, 1990, the disclosure of which is herein incorporated by references.

BACKGROUND OF THE INVENTION

1. Field of the Invention

The present invention relates to a system of electronic reprographics and, more particularly, to a system of electronic reprographics which performs printer dynamic job recovery without any loss in job integrity.

2. Description of the Related Art

In light lens printing systems, a lamp or flashing unit flashes light on a document and has an image created synchronously on a photoreceptor belt. The photoreceptor belt picks up toner from which a copy is made.

In electronic reprographic printing systems, a document or series of documents comprising at least one print job are successively scanned. Upon scanning of the documents, image signals are obtained and electronically stored. The signals are then read out successively and transferred to a printer for formation of the images on paper. Once a document is scanned, it can be printed any number of times or processed in any number of ways (e.g., words deleted or added, image magnified or reduced, etc.). If a plurality of documents comprise a job which is scanned, the processing or manipulation of the scanned documents can include deletion of one or more documents, reordering of the documents into a desired order, or addition of a previously or subsequently scanned document or documents. The printing or processing can be relatively synchronous with scanning, or asynchronous after scanning. If asynchronous, a time interval exists between scanning and printing or processing. The system can then accumulate a number of scanned jobs in the system memory for subsequent processing or printing. The order of the jobs to be printed may be different from the order of jobs as scanned depending on the priority of the jobs and the desires of the operator for increasing productivity or through-put and decreasing printer or scanner downtime.

For a variety of reasons, the printed job may include sheets having images of questionable integrity. This can be the result of a system fault, a Raster Output scanner fault causing a failure to image properly, paper misfeed or misregistration, lack of communication between the Raster, Output scanner and control system, etc.

The related art has disclosed printing systems which include job recovery including sheet purging.

U.S. Pat. No. 4,327,993 to Gauronski et al discloses a method and apparatus for performing job recovery in a reproduction machine wherein purge sheets are sent to a tray not currently in use or to a tray which contains the rest of a copy job. When the purged sheets are sent to the tray which contains the copy job, they must be separated from the copy job once copying is complete.

U.S. Pat. No. 4,206,996 to Clark et al discloses a job recovery method and apparatus wherein duplex job recovery is accomplished by purging all sheets, optionally flagging missing copies by inserting blank sheets into the copy job and then rerunning the copy job as necessary.

There have thus been attempts to remedy the presence of such sheets by providing the systems with the capability to initially purge themselves well prior to the required sheet and initiate job recovery prior to the required sheet after the control system waits for all possible purge sheets in the paper path to be delivered. Operator attention is required, and there is a loss of job integrity caused by the inability to recover to the correct sheet.

OBJECTS AND SUMMARY OF THE INVENTION

Accordingly, one object of the present invention is to provide an electronic reprographic system which provides job recovery without requiring cycling down of the system.

Another object of the present invention is to provide an electronic reprographic system which performs job recover without requiring operator attention.

Another object of the present invention is to provide an electronic reprographic system which performs job recovery without risk of loss of job integrity.

A further object of the present invention is to provide an electronic reprographic system which automatically remedies the presence of sheets having images of questionable integrity.

To achieve the foregoing and other objects and advantages, and to overcome the shortcomings discussed above, an electronic reprographic system having printer dynamic job recovery is provided which detects the presence of sheets having images of questionable integrity. The system operates to remedy the presence of such sheets by redirecting all sheets of questionable integrity to a purge destination and recovering to the correct sheet in the job without requiring any operator attention.

BRIEF DESCRIPTION OF THE DRAWINGS

The invention will be described in detail with reference to the following drawings in which like reference numerals refer to like elements and wherein:

FIG. 7 is a view depicting an exemplary job programming ticket and job scorecard displayed on the User Interface (UI) touchscreen of the printing system shown in FIG. 1;

FIG. 9 is a chart comparing the dynamic recovery implementations according to the present invention.

DETAILED DESCRIPTION OF THE PREFERRED EMBODIMENTS

A. The System

Figure 1:
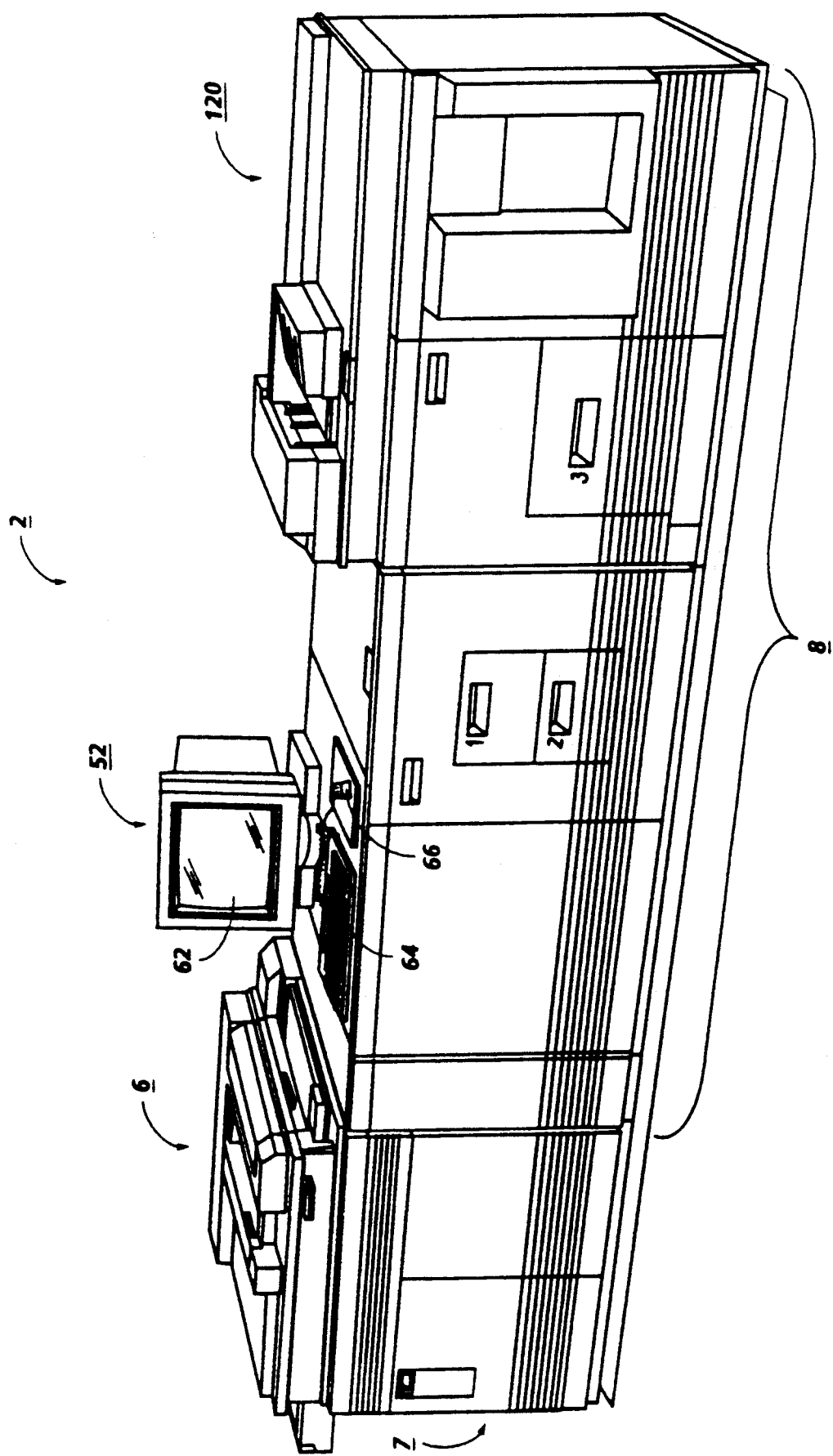
FIG. 1 is a view depicting an electronic printing system incorporating the print media identification system of the present invention.
Figure 2:
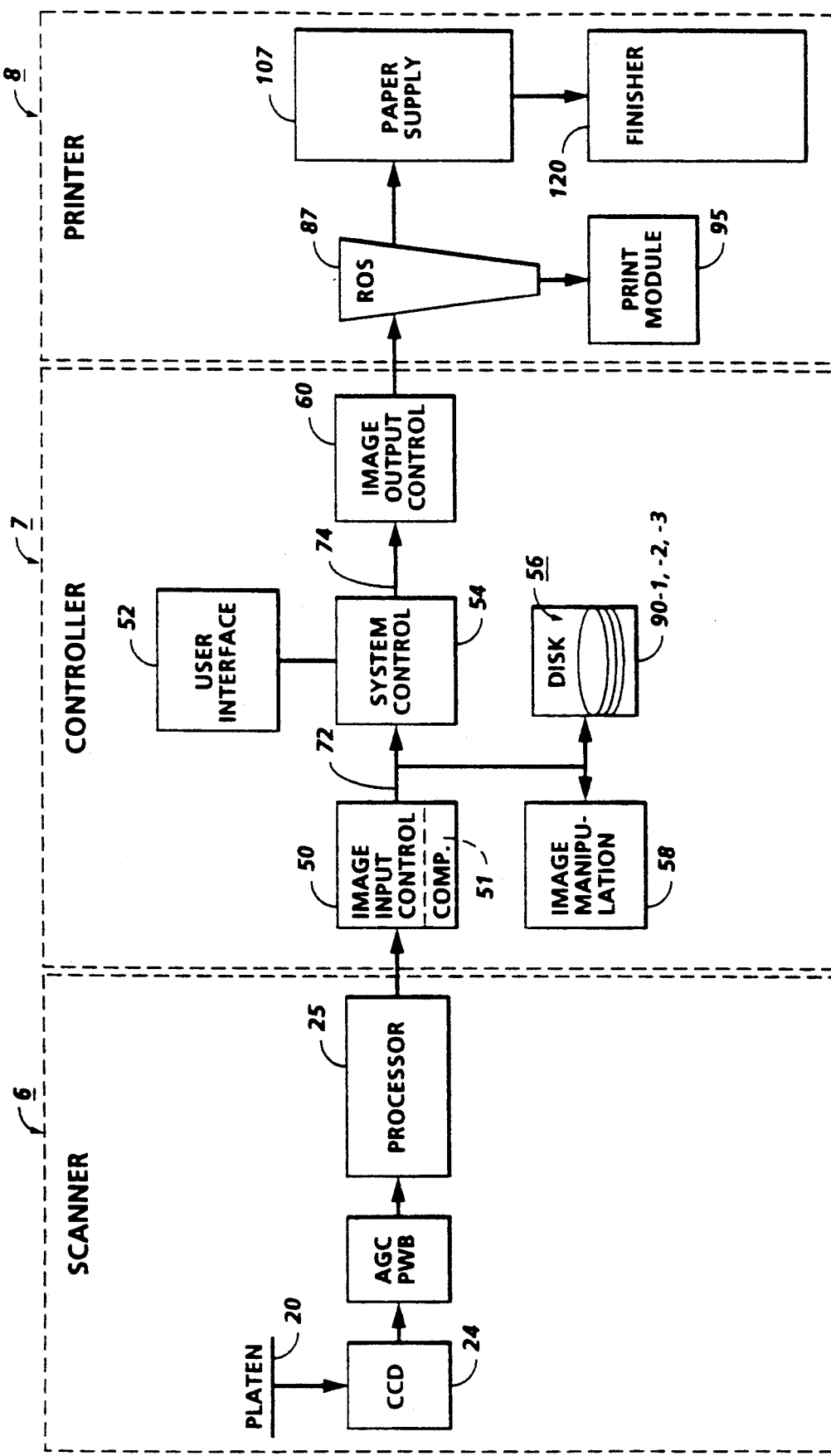
FIG. 2 is a block diagram depicting the major elements of the printing system shown in FIG. 1.

Referring now to the drawings, and particularly to FIGS. 1 and 2 thereof, there is shown an exemplary laser based printing system 2 for processing print jobs in accordance with the teachings of the present invention. Printing system 2, for purposes of explanation, is divided into a scanner section 6, controller section 7, and printer section 8. While a specific printing system is shown and described, the present invention may be used with other types of printing systems such as ink jet, ionographic, etc.

Figure 3:
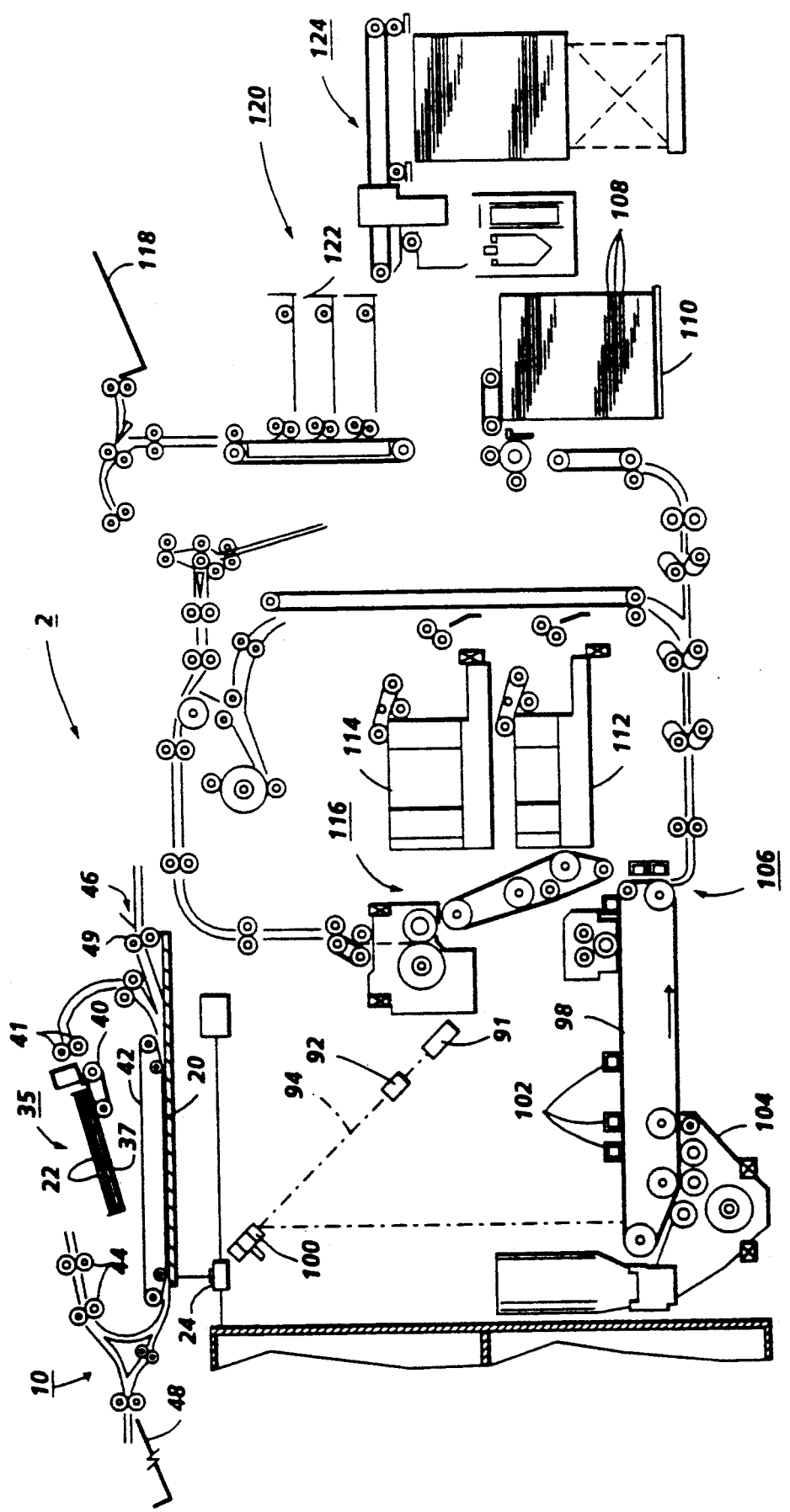
FIG. 3 is a plan view illustrating the principal mechanical components of the printing system shown in FIG. 1.
Figure 4:
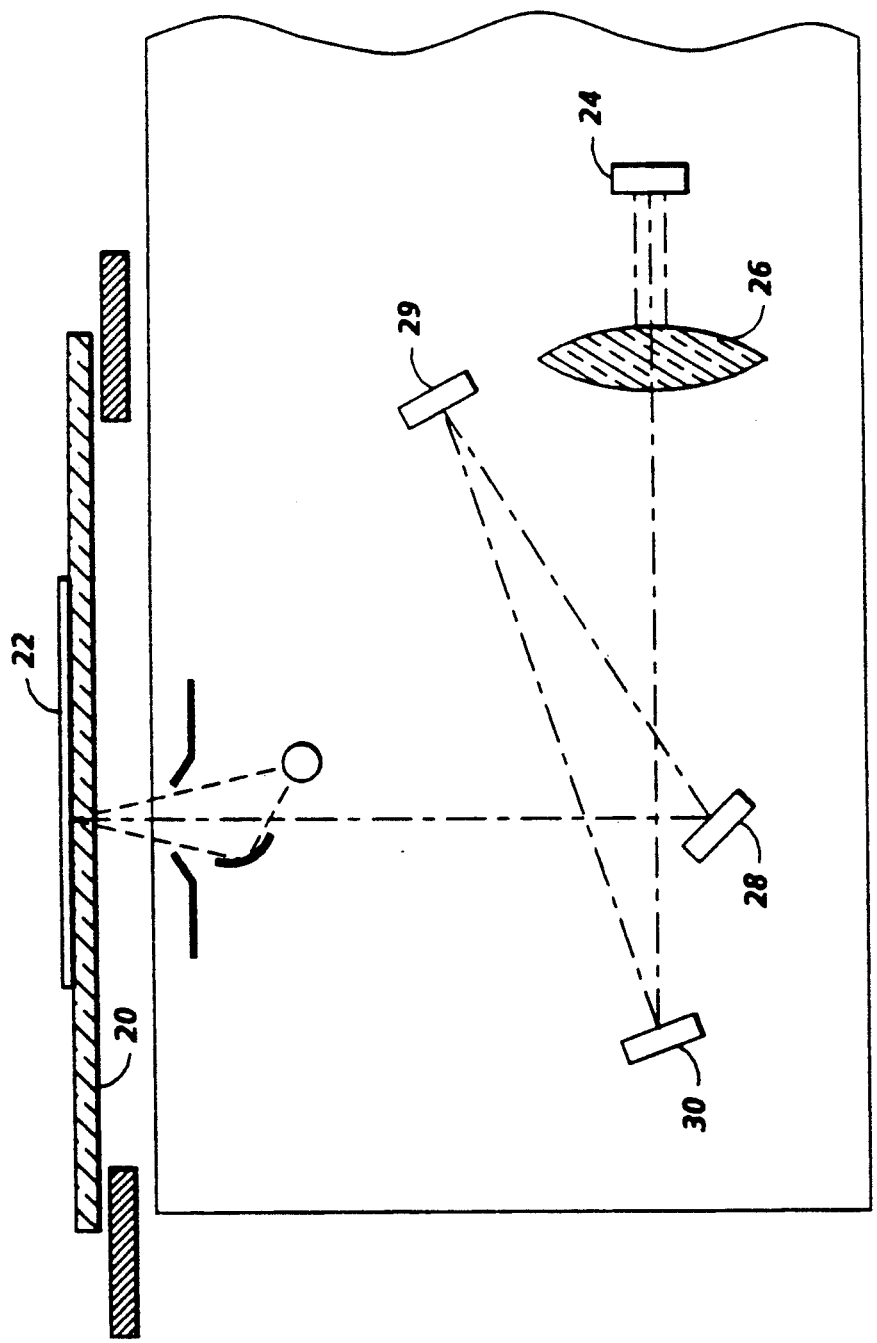
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which, after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40, document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply section 107, and Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main Paper tray 110 or from auxiliary Paper trays 112, or 114. The developed image transferred to the print media 108 is permanently fixed or fused by fuser 116 and the resulting prints discharged to either output tray 118, or to finisher 120. Finisher 120 includes a stitcher 122 for stitching Or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

Figure 5A:
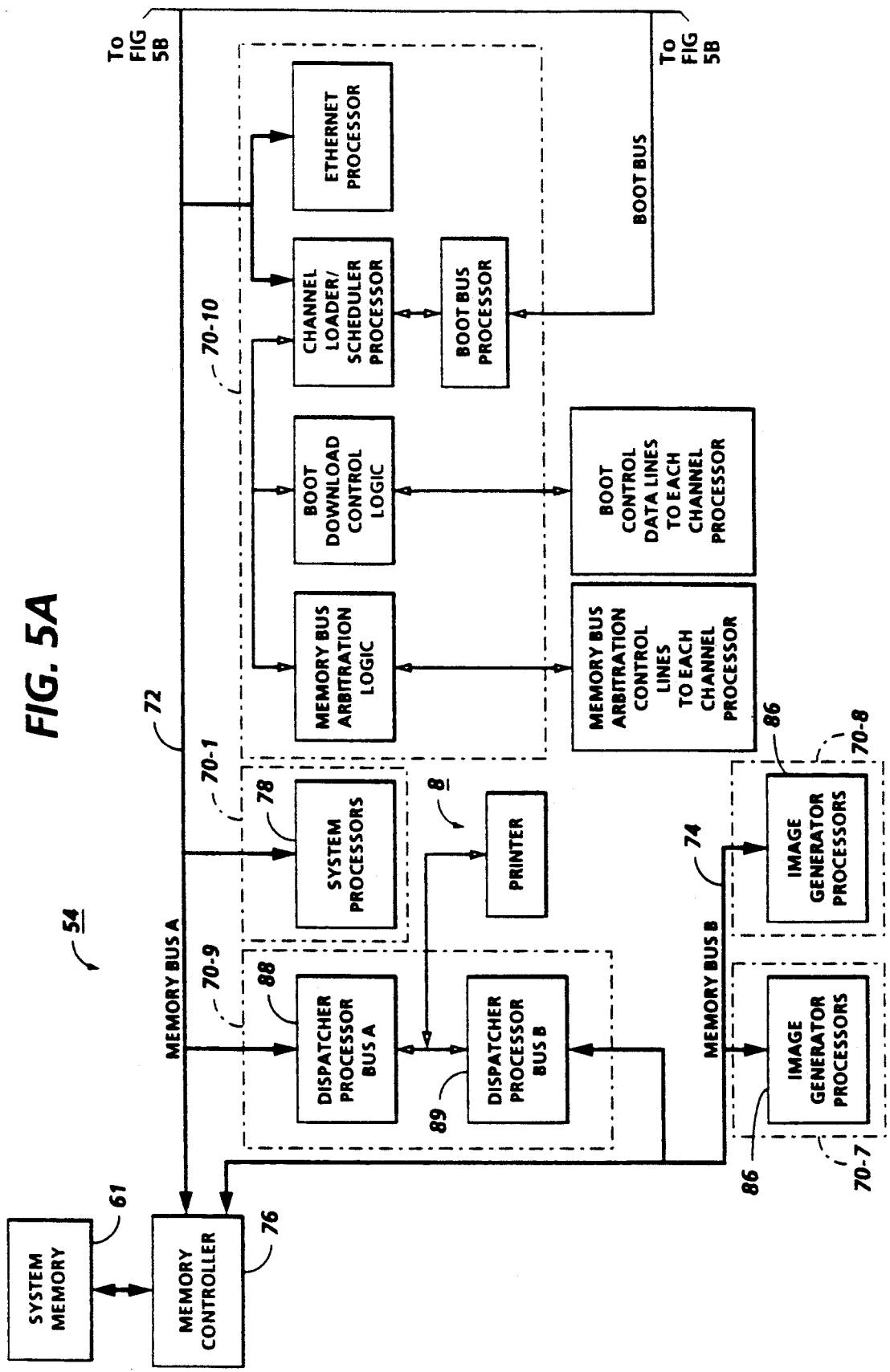
FIGS. 5A, 5B, and 5C comprise a schematic block diagram showing the major parts of the control section for the printing system shown in FIG. 1.
Figure 5B:
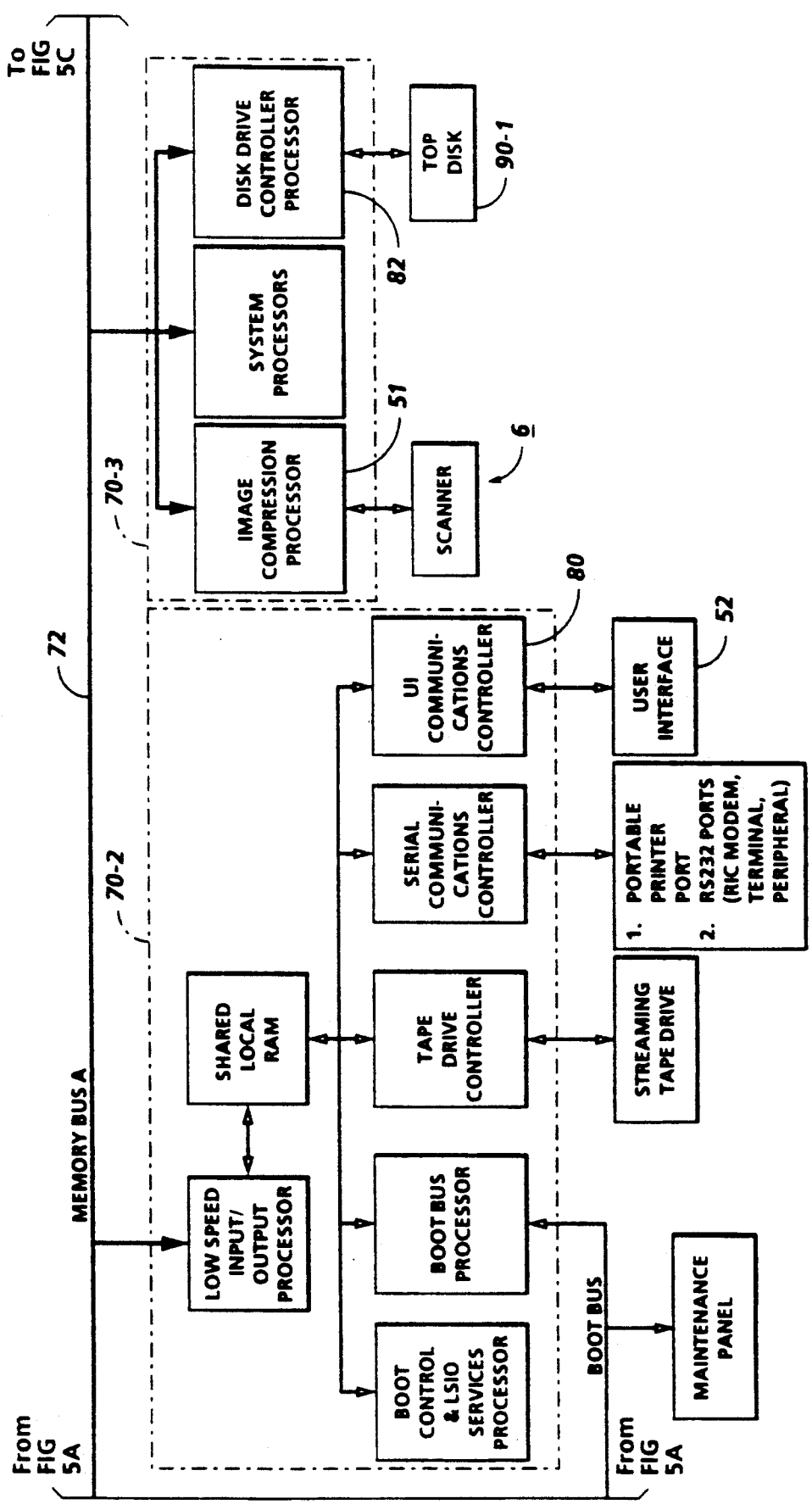
Figure 5C:
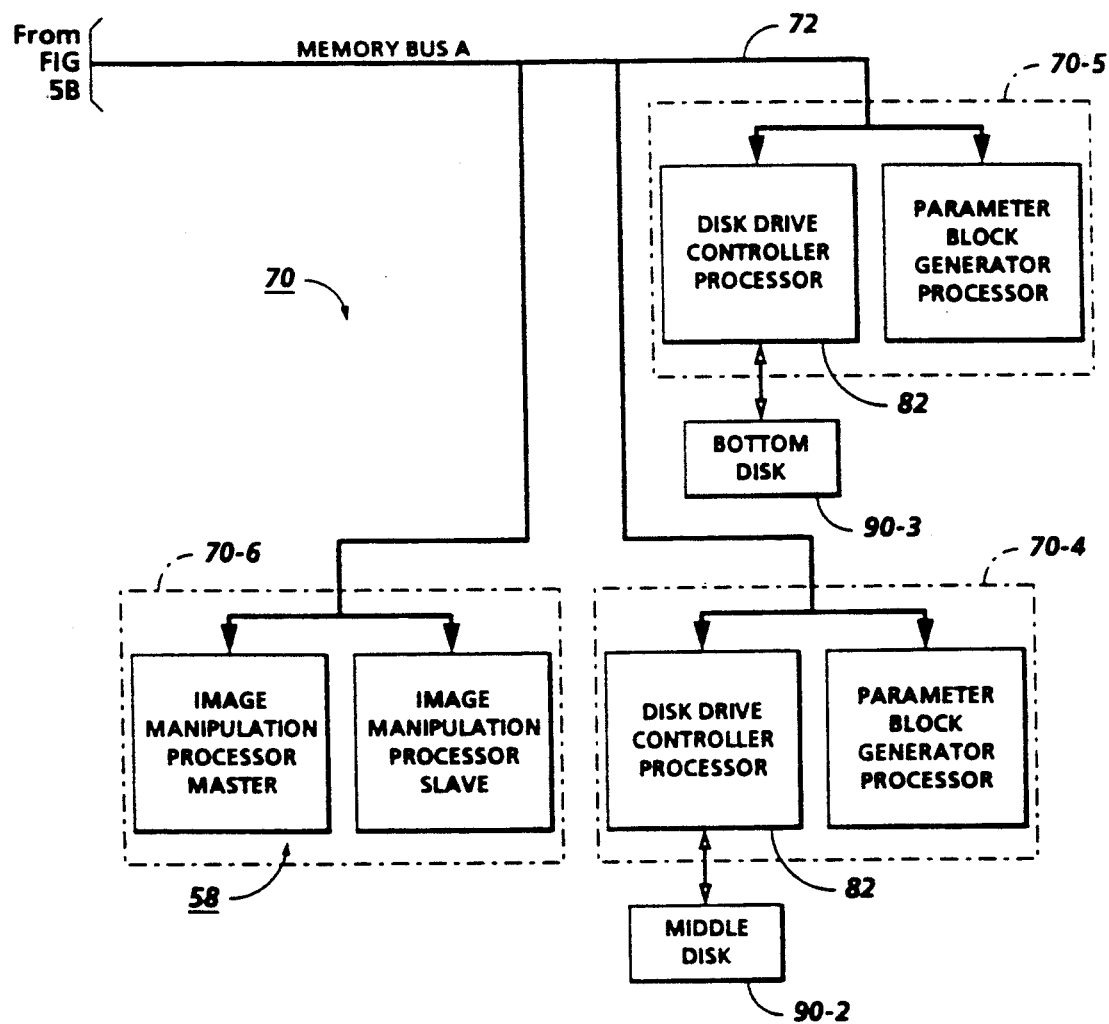

Referring particularly to FIGS. 5A-5C, control section 7 includes a plurality of Printed Wiring Boards (PWB's) 70, PWB's 70 being coupled with one another and with System Memory 61 by a pair of memory buses 72,74. Memory controller 76 couples System Memory 61 with buses 72, 74. PWB's 70 include system processor PWB 70-1 having plural system processors 78; low speed I/0 processor PWB 70-2 having UI communication controller 80 for transmitting data to and from UI 52; PWB's 70-3, 70-4 and 70-5 having disk drive controller/processors 82 for transmitting data to and from disks 90-1, 90-2 and 90-3, respectively, of main memory 56 (image compressor/processor 51 for compressing the image data is on PWB 70-3); image manipulation PWB 70-6 with image manipulation processors of image manipulation section 58; image generation processor PWB's 70-7 and 70-8 with image generation processor 86 for processing the image data for printing by printer section 8; dispatch processor PWB 70-9 having dispatch processors 88 and 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice printers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc., are carried out. Following processing, the data may be returned to main memory 56, sent to UI 52 for display on touchscreen 62, or sent to image output controller 60.

Image data output to image output controller 60 is decompressed and readied for printing by image generating processors 86 of PWB's 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
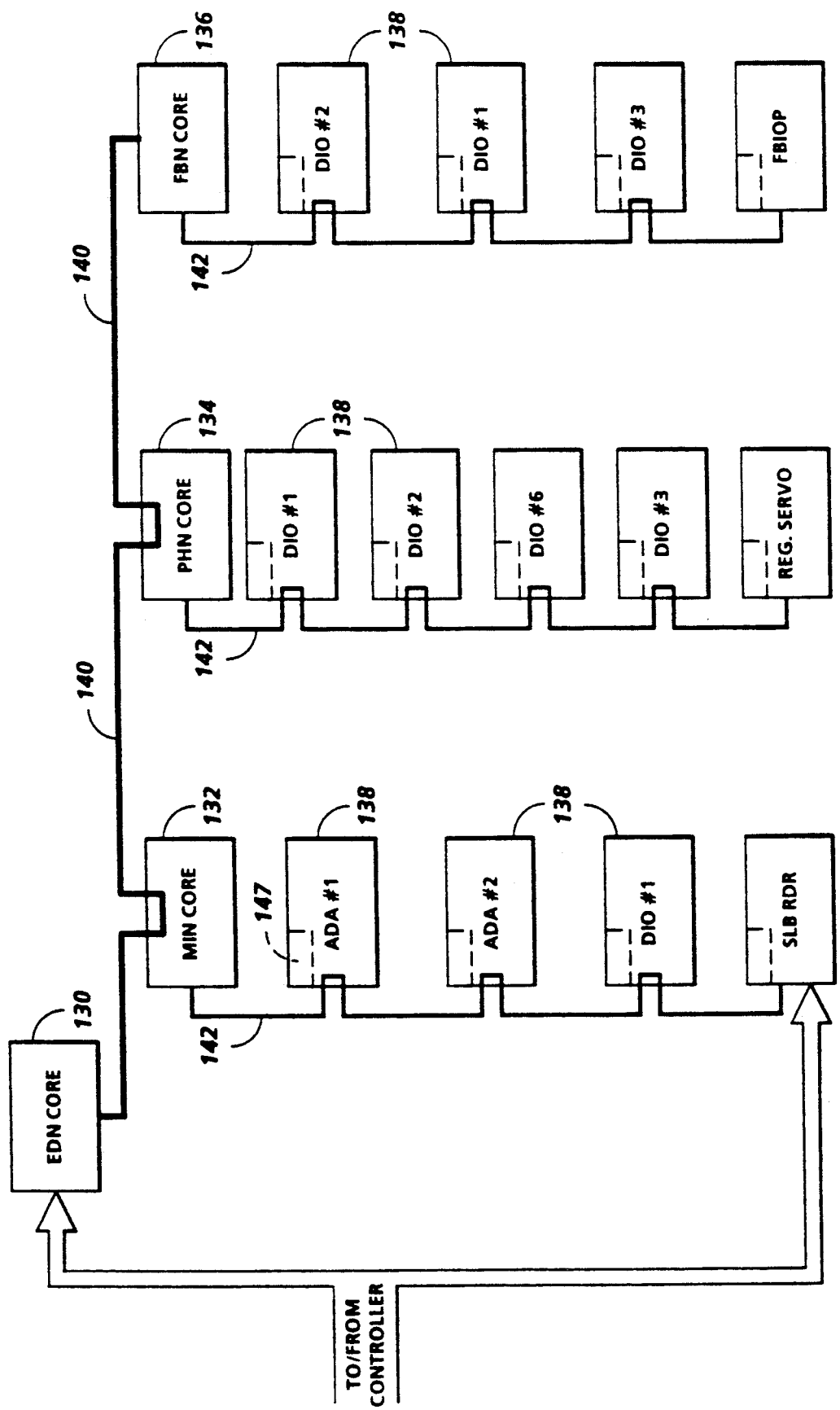
FIG. 6 is a block diagram of an Operating System, together with Printed Wiring Boards and shared line connections for the printing system shown in FIG. 1.

Referring particularly to FIG. 6, system control signals are distributed via a plurality of printed wiring boards (PWB's). These include EDN core PWB 130, Marking Imaging core PWB 132, Paper Handling core PWB 134, and Finisher Binder core PWB 136 together with various Input/Output (I/0) PWB's 138. A system bus 140 couples the core PWB's 130, 132, 134 and 136 with each other and with controller section 7 while local buses 142 serve to couple the I/0 PWB's 138 with each other and with their associated core PWB.

On machine power up, the Operating System software is loaded from memory 56 to EDN core PWB 130 and from there to the remaining core PWB's 132, 134 and 136 via bus 140, each core PWB 130, 132, 134, 136 having a boot ROM (not shown) for controlling downloading of Operating System software to the PWB, fault detection, etc. Boot ROMs also enable transmission of Operating System software and control data to and from PWB's 130, 132, 134 and 136 via bus 140 and control data to and from I/0 PWB's 138 via local buses 142. Additional ROM, RAM, and NVM memory types are resident at various locations within system 2.

Figure 7:
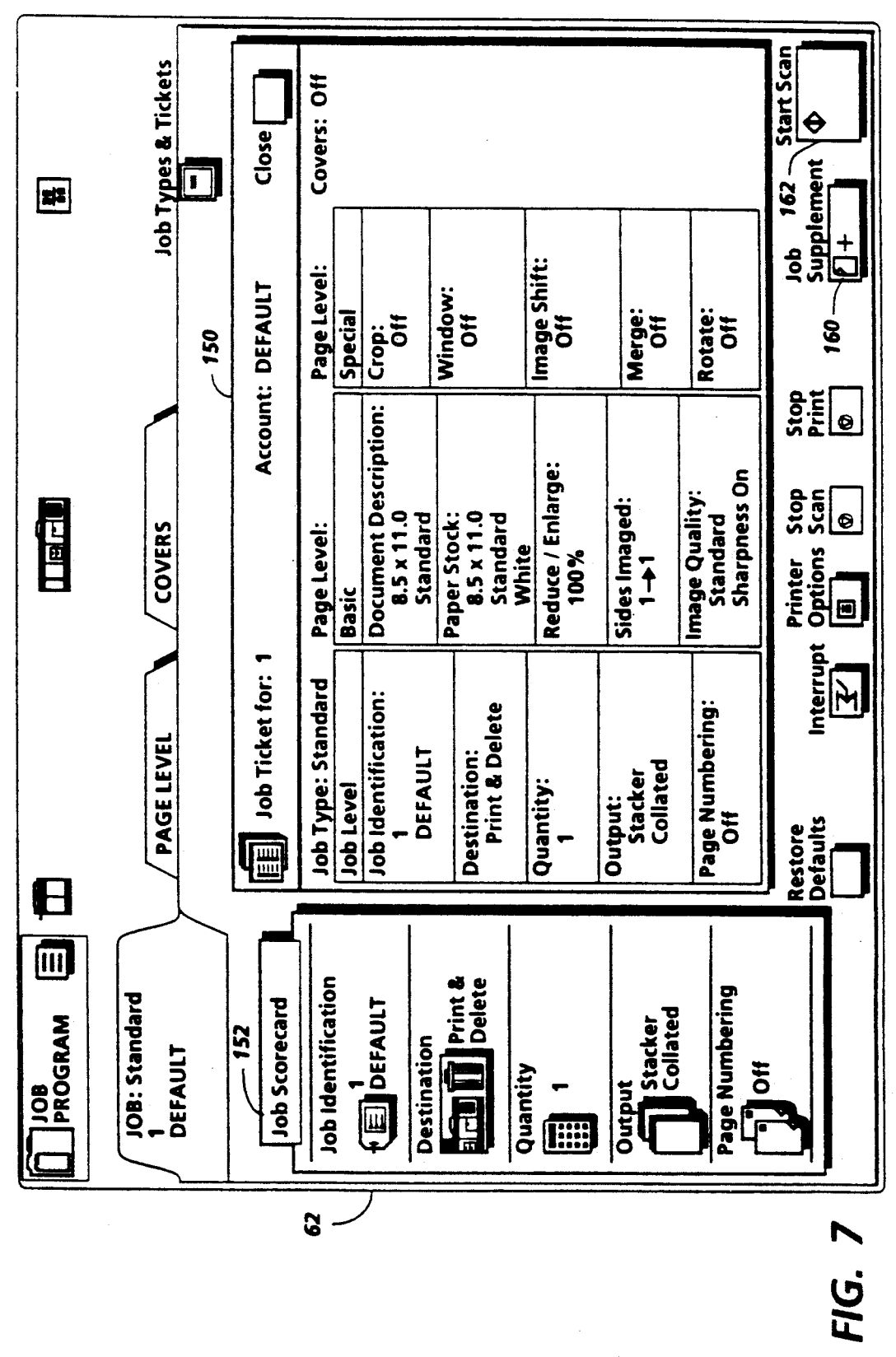

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

B. Fault Recovery

System 2 has the capability to detect and correct for various faults. Upon detection of a fault, system 2 will take the appropriate actions defined for each individual fault or simply take the worst case action for cases where multiple faults are detected.

Dynamic recovery is defined as printer 8 job recovery without cycle down and is used only in conjunction with the video loss purge which is described below. Dynamic recovery requires the printer 8 to assess the job completion progress of all partially completed jobs and start recovery job scheduling without specific direction.

When system 2 is in a full execution mode (i.e., the photoreceptor is being charged and discharged) but a sheet of paper is not being imaged, a pitch skip occurs. A single pitch skip occurs during the printing of a job when controller 7 cannot provide the required print image to the printer 8 at the specified print time for that particular image. Each pitch skip encountered represents a period of time when the printer 8, although in operation, is not producing any hard copy output. The percentage of pitch skips is calculated as the total number of pitch skips divided by the total number of impressions made plus the total number of pitch skips.

Printer 8 can be thought of as requiring an image file at every print pitch, the images being provided to printer 8 by controller 7. If the controller 7 cannot provide the required image before printer 8 is ready to print it, the printer 8 waits, thus incurring pitch skips. The pitch skip is thus due to the controller 7 not being able to provide the required image fast enough.

The printer 8 may skip pitches when performing dynamic recovery after a video loss purge. The printer 8 may skip pitches between the last video loss purge sheet and the next good sheet. The actual number o skip pitches will be decreased by the number of side one sheets committed to a duplex loop at the time that the video loss purge started.

C. Video Loss Purge

When the printer 8 detects, or is informed, that the video data for a sheet in the paper path has lost integrity, a video loss purge is performed. The video loss purge is performed, for example, when there is detected a failure to image properly or when printer 8 detects sheet misregistration. Detection of such a fault automatically results in the application of the video loss purge.

Figure 8A:
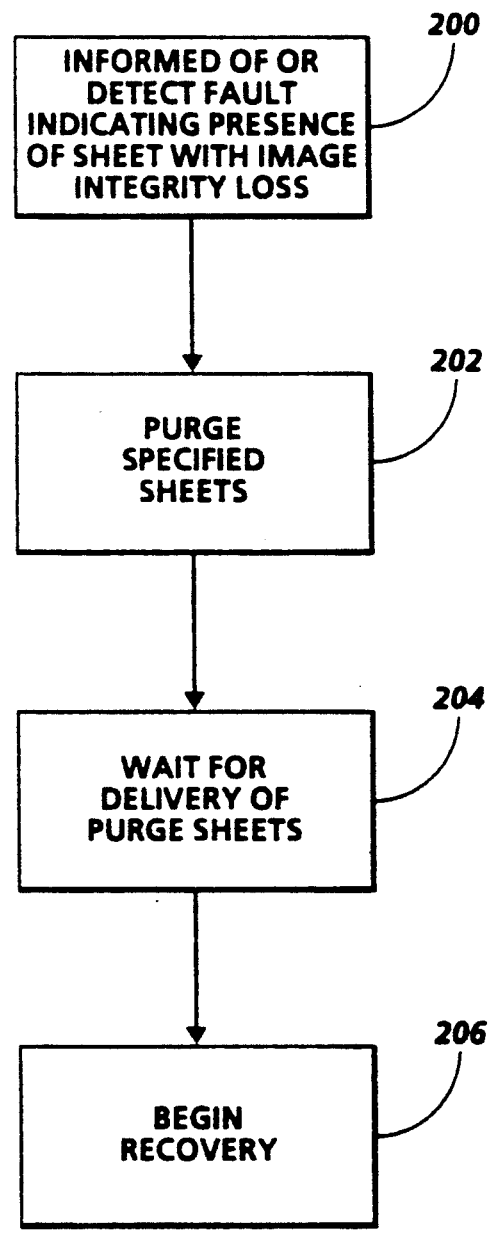
FIGS. 8A, 8B and 8C are flowcharts depicting the operation of the FIG. 1 system upon the detection of sheets having images of questionable integrity.
Figure 8B:
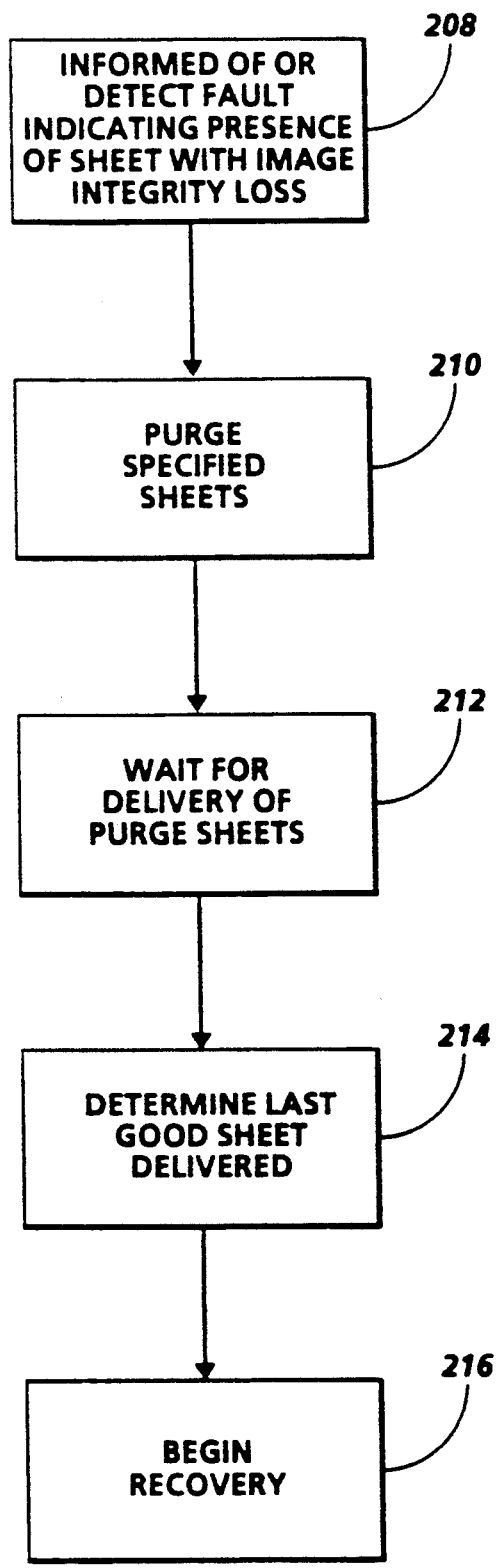
Figure 8C:
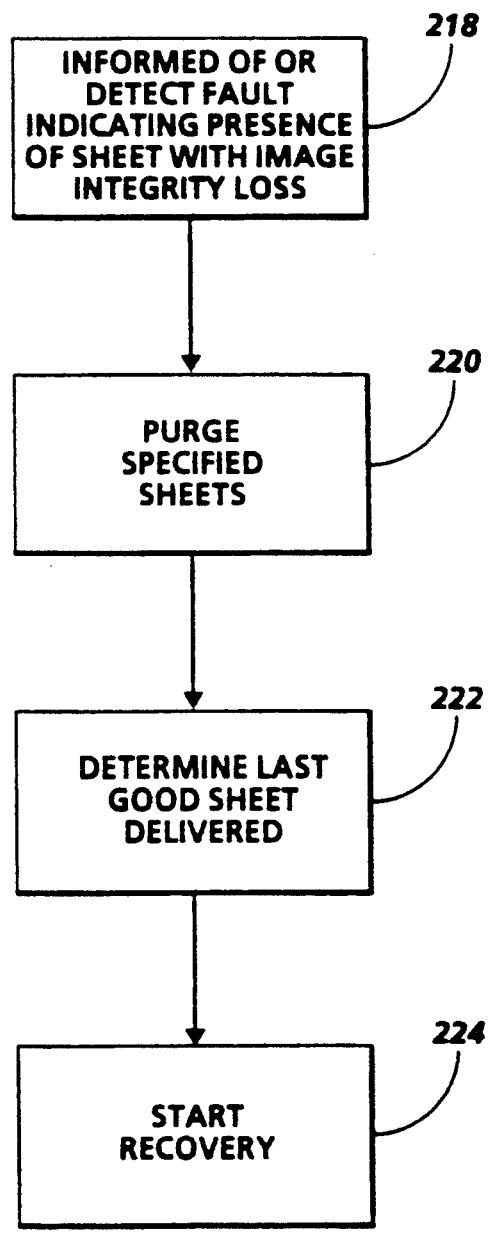

FIGS. 8A–8C depict exemplary operation of system 2 upon performance of dynamic job recovery according to the present invention.

Referring now to FIG. 8A, there is shown a flow chart depicting a basic operation of system 2 upon performance of dynamic job recovery. Printer 8 is informed of or detects a fault indicating the presence of a sheet in the paper path having a video image with a loss of integrity (step 200). Upon such detection, printer 8 redirects the specified sheet and all trailing sheets in the paper path to a specified purge location (step 202). Additionally, all scheduling of additional sheets is momentarily interrupted. According to the present invention, up to three sheets in advance of the specified sheet may be purged. Printer 8 waits for delivery of all purge sheets (step 204). Dynamic job recovery can then be performed as soon as the last purge sheet is delivered (step 206).

FIG. 8B shows a flowchart depicting an optimized operation of system 2 upon performance of dynamic job recovery. As in FIG. 8A, printer 8 is informed of or detects a fault indicating the presence of a sheet in the paper path having a video image with a loss of integrity (step 208). Upon such detection, printer 8 redirects the specified sheet and all following sheets to a specified purge location (step 210). All scheduling of additional sheets is momentarily interrupted. Printer 8 waits for delivery of the first purge sheet (step 212). From the first purge sheet delivery, the printer 8 determines the last good sheet (i.e., sheet whose image has no loss of integrity) which has been successfully delivered (step 214). Optimized dynamic job recovery can then be performed as soon as the first purge sheet is delivered (step 216). Job recovery includes rescheduling of the job based on the delivery of the last good sheet.

FIG. 8C shows a flowchart depicting an advanced operation of system 2 upon performance of dynamic job recovery. Printer 8, as in the previous operations, is informed of or detects a fault indicating the presence of a sheet in the paper path having a video image with a loss of integrity (step 218). Upon such detection, printer 8 redirects the specified sheet and all following sheets to a specified purge location (step 220). Using information on the last sheet scheduled stored in the printer controller memory, the printer 8 immediately determines the last good sheet scheduled prior to the fault occurrence (step 222). Recovery to the correct sheet begins immediately without being based upon the delivery of purge sheets (step 224). FIG. 9 is a chart providing an overall comparison of the exemplary operations described above.

By limiting the number of sheets purged by the system, dynamic job recovery can thus be initiated significantly sooner since the system is not required to await delivery of a large number of purge sheets. Only a minimum number of sheets need be purged. Job scheduling is resumed with the next sheet, thereby improving printer productivity while reducing the operator perceived malfunction rate. A foundation is provided for a retry strategy for all malfunctions that do not require immediately turning off paper path drives. As the dynamic job recovery is performed automatically, no operator attention is required. Job integrity is maintained by job rescheduling to replace all sheets purged to the purged destination.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method for dynamic job recovery in an electronic reprographic system comprising the steps of:
   automatically detecting the presence of a printed sheet having an image thereon with a relative loss of integrity;
   automatically purging specified sheets to a specified location upon said detection, said purging step including initiating purging at a specific sheet with respect to the first sheet detected having an image thereon with loss of integrity and purging said specific sheet and all sheets in a paper path trailing said specific sheet, regardless of whether the purged sheets have an image thereon with loss of integrity;
   awaiting delivery of said purged sheets at said specified location; and
   initiating dynamic job recovery as soon as all the specified sheets have been delivered, said steps being performed without cycling down of the electronic reprographic system and without operator intervention, said dynamic job recovery including assessing job completion progress of all partially completed jobs and starting recovery job scheduling without specific direction.

2. The method as recited in claim 1, wherein said step of automatically purging includes initiating purging at the first sheet detected having an image thereon with a loss of integrity.

3. The method as recited in claim 1, wherein said step of initiating job recovery includes recovering to the correct sheet to complete a job being printed.

4. The method as recited in claim 1, wherein said purging step includes purging up to three sheets in advance of the first sheet.

5. An apparatus for dynamic job recovery in an electronic reprographic system comprising:
   detection means for automatically detecting the presence of a printed sheet having an image thereon with a relative loss of integrity;
   purge means for automatically purging specified sheets to a specified location upon said detection, said purge means initiating purging at a specific sheet with respect to the first sheet detected having an image thereon with loss of integrity and purging said specific sheet and all sheets in a paper path trailing said specific sheet, regardless of whether the purged sheets have an image thereon with loss of integrity;
   awaiting means for awaiting delivery of said purged sheets at said specific location; and
   recovery means for initiating dynamic job recovery as soon as all the specified sheets have been delivered, said recovery means operating without cycling down of the electronic reprographic system and without operator intervention, said dynamic job recovery including assessing job completion progress of all partially completed jobs and starting recovery job scheduling without specific direction.

6. The apparatus as recited in claim 5, wherein said purge means initiates purging at the first sheet detected having an image thereon with a loss of integrity.

7. The apparatus as recited in claim 5, wherein said recovery means recovers to the correct sheet to complete a job being printed.

8. The apparatus as recited in claim 5, wherein said purge means purges up to three sheets in advance of the first sheet.

9. A method for dynamic job recovery in an electronic reprographic system comprising the steps of:
   automatically detecting the presence of a printed sheet having an image thereon with a relative loss of integrity;
   automatically purging specified sheets to a specified location upon said detection, said purging step initiating purging at the first sheet detected having an image thereon with a loss of integrity and purging said first sheet and all sheets in a paper path trailing said first sheet, regardless of whether the trailing sheets have an image thereon with loss of integrity; and immediately initiating dynamic job recovery upon detection of a sheet having an image thereon with a relative loss of integrity, said steps being performed without cycling down of the electronic reprographic system and without operator intervention, said dynamic job recovery including assessing job completion progress of all partially completed jobs and starting recovery job scheduling without specific direction.

10. The method as recited in claim 9, wherein said job recovery initiating step includes recovering to the correct sheet to complete a job being printed.

11. An apparatus for dynamic job recovery in an electronic system comprising:

detection means for automatically detecting the presence of a printed sheet having an image thereon with a relative loss of integrity;

purge means for automatically purging specified sheets to a specified location upon said detection, said purge means initiating purging at the first sheet detected having an image thereon with a loss of integrity and purging said first sheet and all sheets in a paper path trailing said first sheet, regardless of whether the trailing sheets have an image thereon with loss of integrity; and recovery means for immediately initiating dynamic job recovery upon detection of a sheet having an image thereon with a relative loss of integrity, said recovery means operating without cycling down of the electronic reprographic system and without operator intervention, said dynamic job recovery including assessing job completion progress of all partially completed jobs and starting recovery job scheduling without specific direction.

12. The apparatus as recited in claim 11, wherein said recovery means recovers to the correct sheet to complete a job being printed.

* * * * *